United States Patent
Huai et al.

(10) Patent No.: US 6,275,354 B1
(45) Date of Patent: *Aug. 14, 2001

(54) MAGNETIC HEAD WITH A TOROIDAL COIL ENCOMPASSING ONLY ONE YOKE LAYER

(75) Inventors: Yiming Huai, Pleasanton; Zhupei Shi, San Jose; Yong Shen, Milpitas; Billy Wayne Crue, San Jose, all of CA (US)

(73) Assignee: Read-Rite Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,006

(22) Filed: Jan. 21, 1998

(51) Int. Cl.[7] .................................................... G11B 5/147
(52) U.S. Cl. ............................................. 360/126; 360/123
(58) Field of Search ................................... 360/123, 126, 360/113

(56) References Cited

U.S. PATENT DOCUMENTS

| | | | | |
|---|---|---|---|---|
| 3,662,119 | * | 5/1972 | Romankiw et al. .................. | 360/126 |
| 4,652,957 | * | 3/1987 | Schewe et al. ...................... | 360/125 |
| 4,972,287 | * | 11/1990 | Das ...................................... | 360/126 |
| 5,113,300 | * | 5/1992 | Ikeda et al. ......................... | 360/126 |
| 5,465,475 | * | 11/1995 | Kinoshita et al. ................ | 29/603.16 |
| 5,473,491 | * | 12/1995 | Fujisawa et al. .................... | 360/126 |
| 5,486,963 | * | 1/1996 | Jones, Jr. ............................. | 360/104 |
| 5,600,520 | * | 2/1997 | Aokura et al. ....................... | 360/126 |
| 5,621,594 | * | 4/1997 | Gray et al. ........................... | 360/123 |
| 5,668,689 | * | 9/1997 | Schultz et al. ...................... | 360/113 |
| 5,703,740 | * | 12/1997 | Cohen et al. ........................ | 360/126 |
| 5,831,801 | * | 11/1998 | Shouji et al. ........................ | 360/126 |
| 5,856,898 | * | 1/1999 | Ohashi ................................. | 360/126 |

* cited by examiner

Primary Examiner—Brian E. Miller
(74) Attorney, Agent, or Firm—Nathan N. Kallman

(57) ABSTRACT

A magnetic head includes first and second magnetic yoke layers which contact each other at a back closure region at one end and delineate a transducer gap at another end. A toroidal coil encompasses one of the yoke layers. The coil axis of the toroidal coil passes through the encompassed yoke layer. During data writing, electrical current passes through the toroidal coil inducing magnetic flux along the coil axis, which flux is efficiently and directly delivered to the transducer gap for writing on a recording medium. During data reading, magnetic flux intercepted by the transducer gap flows along the encompassed yoke layer and efficiently induces electrical current in the toroidal coil for amplification. In alternative embodiments, separate read transducers are disposed adjacent to the toroidal coils to form merged heads.

10 Claims, 7 Drawing Sheets

MAGNETIC HEAD WITH A TOROIDAL COIL ENCOMPASSING ONLY ONE YOKE LAYER

FIELD OF THE INVENTION

This invention relates to magnetic heads and in particular to low profile magnetic heads incorporating toroidal coils capable of transducing high areal density signals at high data transfer rates.

BACKGROUND OF THE INVENTION

Magnetic recording media in the form of tapes or disks have widely been used for data storage. Magnetic heads are commonly employed to perform the tasks of interacting with these recording media.

Figure 1:
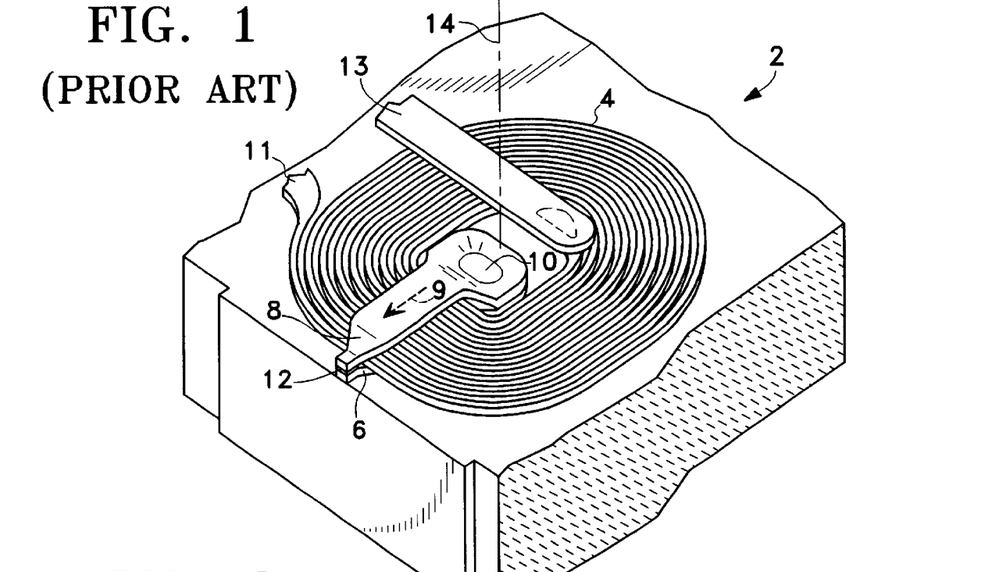
FIG. 1 is a perspective view of a prior art magnetic head.

FIG. 1 shows a conventional magnetic head 2 comprising a flat inductive coil 4 sandwiched between a first yoke layer 6 and a second yoke layer 8. The two magnetic yoke layers 6 and 8 contact each other at a back closure region 10 at one end to form a magnetic path 9 and define a narrow transducing gap 12 at another end. During data writing, electrical current representing information passes through a pair of electrical leads 11 and 13 and through the inductive coil 4 to induce magnetic flux along the magnetic path 9. The induced magnetic flux reaches the narrow gap 12 and magnetizes a moving recording medium (not shown) disposed close by.

During data reading, magnetic flux emanating from a recorded medium (not shown) is intercepted by the narrow gap 12. The intercepted magnetic flux flows along the continuous magnetic path 9 defined by the two yoke layers 6 and 8 and induces electrical current in the inductive coil 4. The induced current in the coil 4, which is directed through the electrical leads 11 and 13, corresponds to the data stored on the recording medium.

As shown in FIG. 1, the inductive coil 4 of the head 2 is geometrically flat in topology. As is known in the art, when current passes though a structure, such as the coil 4, induced magnetic flux is mostly generated at the central region adjacent to the axis 14 of the coil 4. It is the back closure region 10, with its relatively wide physical area and high permeability, that captures the induced magnetic flux for transmission to the gap 12 during data writing. The magnetic flux has to pass through a long magnetic path 9 which is defined by the second yoke layer 8. This arrangement is undesirable in several aspects. First, the long magnetic path 9 contributes substantially to the reluctance of the magnetic head 2 and renders the head 2 less effective in flux transmission. To compensate for the inefficiency, the coil 4 is normally wound with a large number of turns. As a consequence, the inductance of the coil is further increased. A magnetic head with high inductance is sluggish in response to writing current during the data writing mode and incapable of reading media at a high rate during the data reading mode. Furthermore, the long magnetic path with the irregular geometrical topology is the main source of magnetic domain instabilities, which is especially enhanced at the back closure region 10 where a highly unstable domain pattern, commonly called the "spider web" pattern, resides. The constant merging and splitting of the unstable magnetic domains in the yoke layers 6 and 8 during operation significantly produces Barkhausen noise (also called popcorn noise) to the head 2 and accordingly lowers the signal-to-noise ratio (SNR) of the head. To compound the situation further, the coil 4 with the large number of windings is also high in ohmic resistance which is a key contributor to Johnson noise. As a consequence, the SNR is further degraded.

Figure 2:
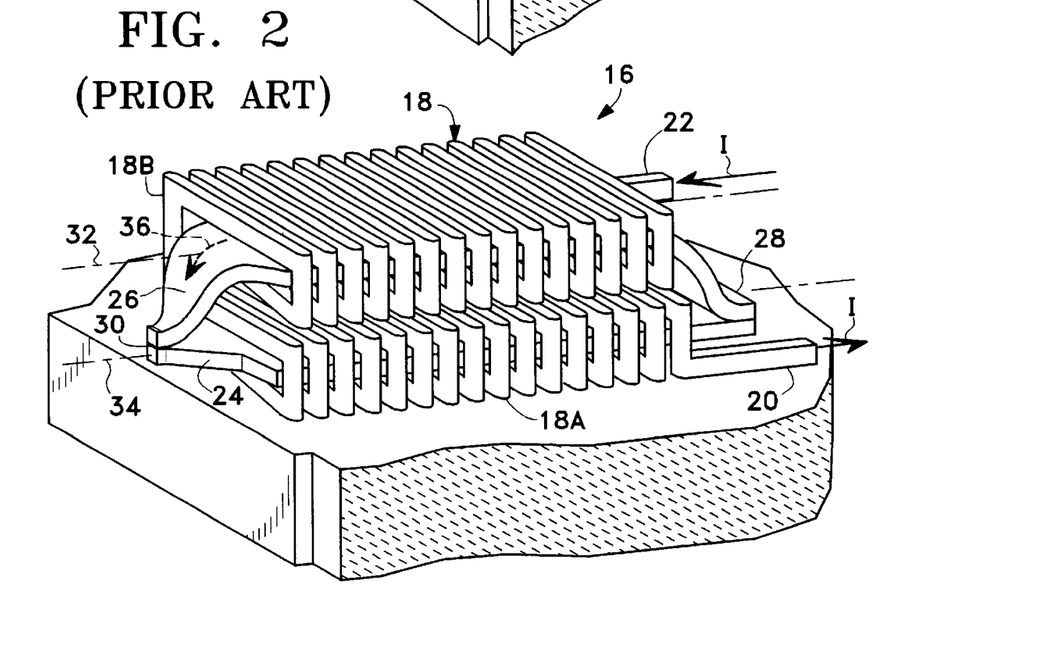
FIG. 2 is a perspective view of another prior art magnetic head.

To solve the aforementioned problems, different kinds of magnetic heads have been suggested. FIG. 2 illustrates a prior art magnetic head described in Cohen et al., "Toroidal Head Supports High Data Transfer Rates", Data Storage, February 1997, pp 23–28. FIG. 2 shows a magnetic head 16 that includes a toroidal coil 18 formed of two coil segments 18A and 18B. The first coil segment 18A is connected in series to the second coil segment 18B. Electrical leads 20 and 22 are connected to the first and second coil segments 18A and 18B, respectively. The first coil segment 18A wraps around a first yoke layer 24. In a similar manner, the second coil segment 18B surrounds a second yoke layer 26. The two yoke layers 24 and 26 contact each other at a back closure region 28 at one end, and define a narrow transducing gap 30 at another end. With this arrangement, a continuous magnetic path 36 with the transducing gap 30 is defined by the two yoke layers 24 and 26.

During data writing, writing current I passes through the coil 18 via the electrical leads 20 and 22. Magnetic flux is accordingly induced in the coil 18. In a similar fashion as with the coil 4 shown in FIG. 1, the coil segments 18A and 18B, being spiral structures, generate magnetic flux around the areas adjacent to the coil axes 32 and 34, respectively. The induced flux flows directly through the two yoke layers 24 and 26 without relying on the back closure region 28 for flux collecting. The head 16 is more efficient in controlling flux flow, and consequently has better performance.

Advantageous as it appears, the head 16 still requires the coil 18 to be wound with a large number of coil turns. Therefore, the head 16 has undesirable high inductance.

In Cohen et al., the authors are fully aware of the detrimental effects of the high coil inductance on head performance. In fact, Cohen et al. specifically state that the head inductance L is proportional to the square of the number of coil windings N, while the output signal generated by the head 16 only increases linearly with the number of coil windings N. The prior art head 16 is fabricated with a large number of coil turns N, required to effectively drive the two long yoke layers 24 and 26 which are high in magnetic reluctance. There are two coil segments 18A and 18B sandwiched between the two yoke layers 24 and 26 which exacerbate the curvature of the second yoke layer 26. Consequently a longer second yoke layer 26 is required to define the magnetic path 36. With a longer and more curved magnetic path 36, more coil windings are needed to drive the yoke layers 24 and 26 in order to supply sufficient field strength from the narrow gap layer 30. The overall effect is that the head 16 is burdened with a high inductance.

Data storage products are now built with smaller geometrical sizes and with higher storage capacities. To interact with these storage products having narrow track widths and high areal densities, a magnetic head needs to have low head inductance, thereby providing sufficient agility and responsiveness to the head during normal operation. Also, the head must provide a high SNR such that valid signals are not overshadowed by background noise. Furthermore, the head must be small in physical geometry and thus be compatible with miniaturized air bearing sliders which are designed to accommodate the rapid movements of the actuator arms of the disk drives. All of these features impose stringent requirements in the design and manufacturing of a magnetic head.

SUMMARY OF THE INVENTION

It is an object of the invention to provide a magnetic head with a magnetic path which is efficient in flux flow enabling the head to perform with agility and sensitivity.

It is another object of the invention to provide a magnetic head with low inductance allowing the head to operate with high frequency signals.

It is yet another object of the invention to provide a magnetic head characterized by a high signal-to-noise ratio.

It is still another object of the invention to provide a magnetic head that is easy to fabricate and with low manufacturing cost.

In an embodiment of the invention, a magnetic head includes first and second magnetic yoke layers having a toroidal coil encompassing one of the yoke layers. The yoke layers contact each other at a back closure region at one end, and define a transducing gap at the other end. The axis of the toroidal coil is positioned to pass within the encompassed yoke layer. During the data writing mode, electrical current passing through the toroidal coil induces magnetic flux along the coil axis, which flux is efficiently delivered to the transducing gap for writing data. During the data reading mode, magnetic flux intercepted by the transducing gap flows along the encompassed yoke layer and efficiently induces electrical current in the toroidal coil for amplification.

In alternative embodiments, the magnetic heads are built as merged heads that include read sensors, such as anisotropic magnetoresistive (AMR) transducers or giant magnetoresistive (GMR) transducers.

DETAILED DESCRIPTION OF THE INVENTION

Figure 3:
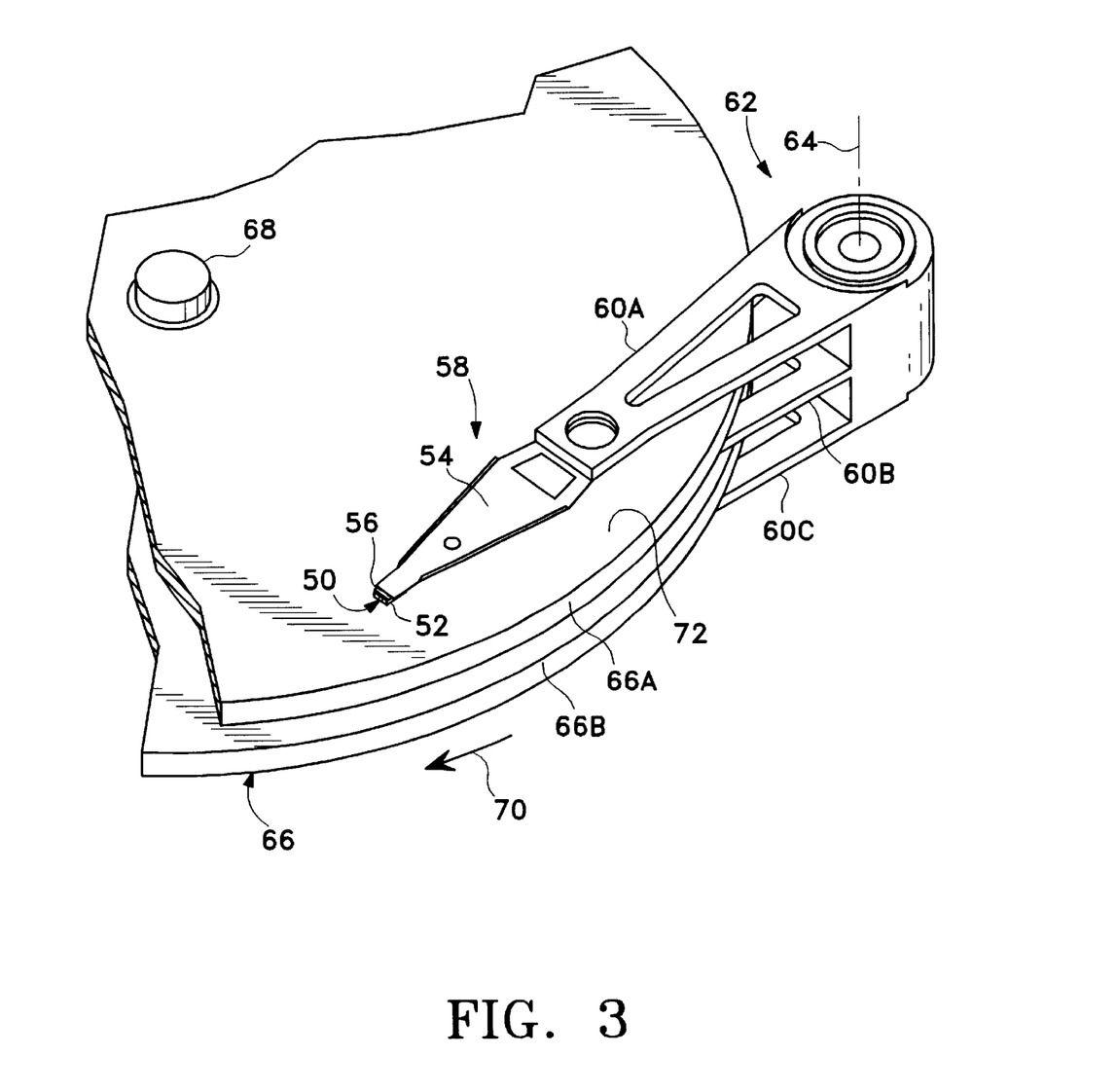
FIG. 3 is a perspective view, partially broken away, illustrating an exemplary use of the magnetic head of the invention.

With reference to FIG. 3, a magnetic transducer 50 is supported by an air bearing slider 52, which is mounted on a flexure 56, which in turn is attached to a load beam 54. The slider 52, the flexure 56, and the load beam 54 are collectively called a head gimbal assembly (HGA) 58 that is joined to an actuator arm 60A of an arm assembly 62 rotatable about an arm axis 64. A stack of spaced apart rotary magnetic disks 66 is mounted to a common spindle 68. The actuator arm assembly 62 includes a plurality of actuator arm branches 60A–60C which extend into the spacings between the disks 66A and 66B.

During normal operation, the disks 66A and 66B spin at high speed in the direction 70 about the spindle 68. The aerodynamics of the moving air between the slider 52 and the disk surface 72 suspends the slider 52 above the disk surface 72 of the disk 66A, for example. On the other hand, the spring forces of the load beam 54 and the resilient flexure 56 urge the slider toward the disk surface 72. An equilibrium point is reached where the slider 16 flies over the disk surface 72 at a substantially constant flying height.

Figure 5:
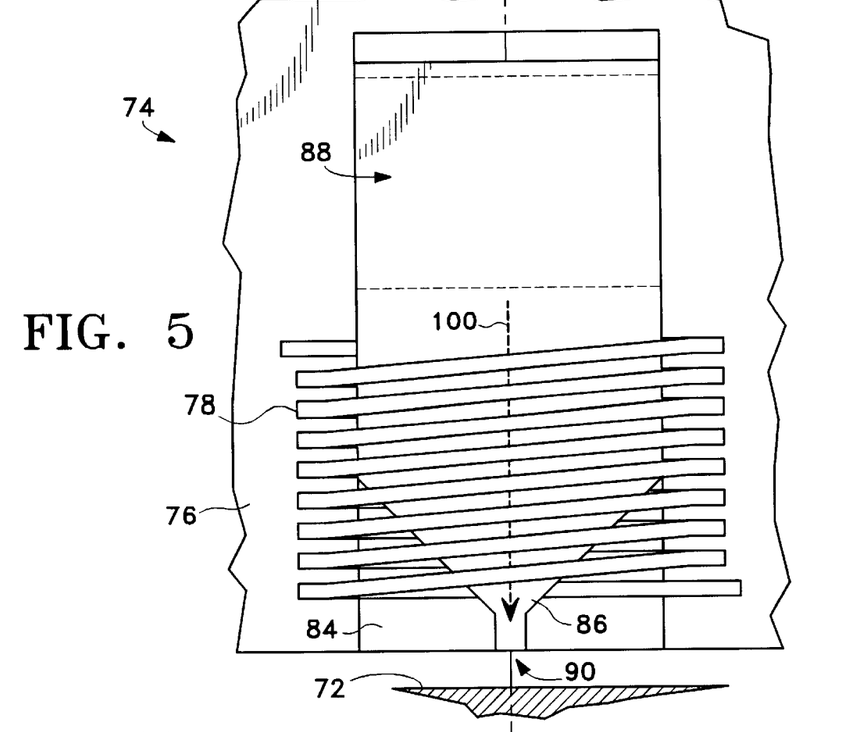
FIG. 5 is a top plan view taken along the line 5—5 of FIG. 4.
Figure 6:
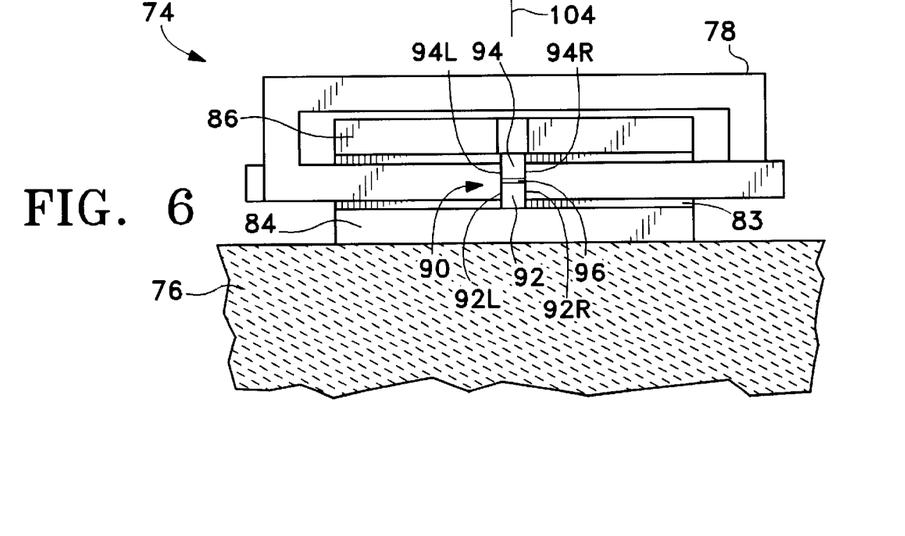
FIG. 6 is a front elevational view taken along the line 6—6 of FIG. 4.
Figure 7:
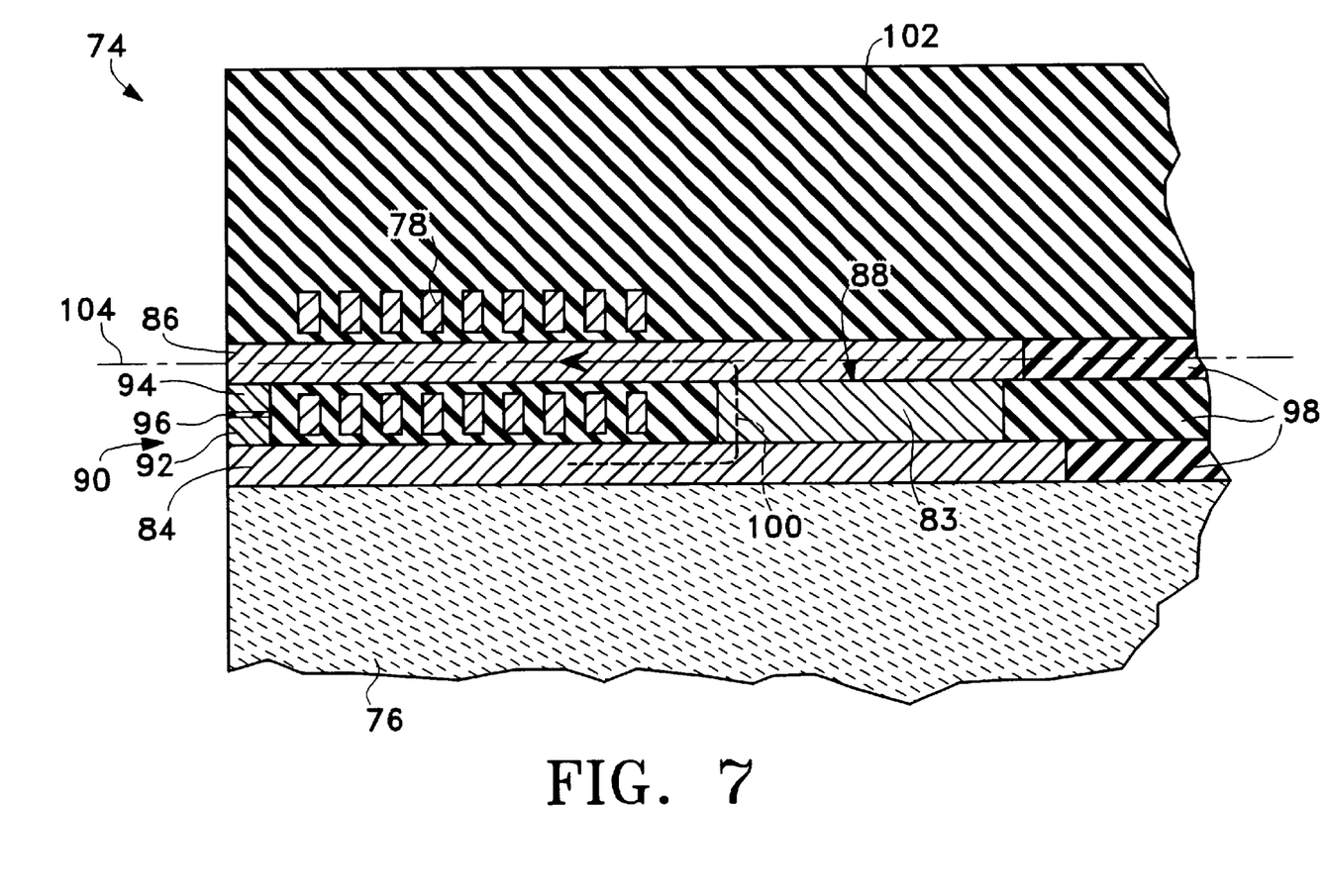
FIG. 7 is cross-sectional side view taken along the line 7—7 of FIG. 4.

FIGS. 4–7 show one embodiment of a magnetic head 74 which may be an inductive head. For the sake of clarity, the protective and insulating layers are removed in FIGS. 4–6 exposing the relevant components of the magnetic head 74. The protective and insulating layers are shown in FIG. 7.

The magnetic head 74 is formed on a substrate 76 preferably made of a material that is nonmagnetic and nonconducting, such as ceramic, for example. Above the substrate 76 is a first yoke layer 84. An inductive coil 78 is disposed above the first yoke layer 84. The coil 78 is toroidal in shape and encompasses the second yoke layer 86. The toroidal coil 78 has a coil axis 104 which passes through the second yoke layer 86. A portion of the coil 78 is sandwiched between the first yoke layer 84 and a second yoke layer 86.

The first and second yoke layers 84 and 86 of the magnetic head 74 form a closed magnetic path 100 through a back closure region 88 and a tip region 90. The back closure region 88 includes a feedthrough 83 joining the first yoke layer 84 and the second yoke layer 86. The tip region 90 comprises first and second pole tip layers 92 and 94 separated by gap layer 96. The head 74 comprises vertically aligned sidewalls for the first and second pole tips 92 and 94 as shown in FIG. 6. Specifically, the left sidewall 92L of the first pole tip 92 is in vertical alignment with the left sidewall 94L of the second pole tip 94. Similarly, the right sidewall 92R of the first pole tip 92 is flush with the right sidewall 94R of the second pole tip 94. The aligned sidewalls 92L, 94L, and 92R, 94R substantially reduce fringing flux from one pole tip to another, thereby enabling the magnetic head 74 to write data with well-defined data tracks on the medium surface 72 (FIG. 5).

Figure 4:
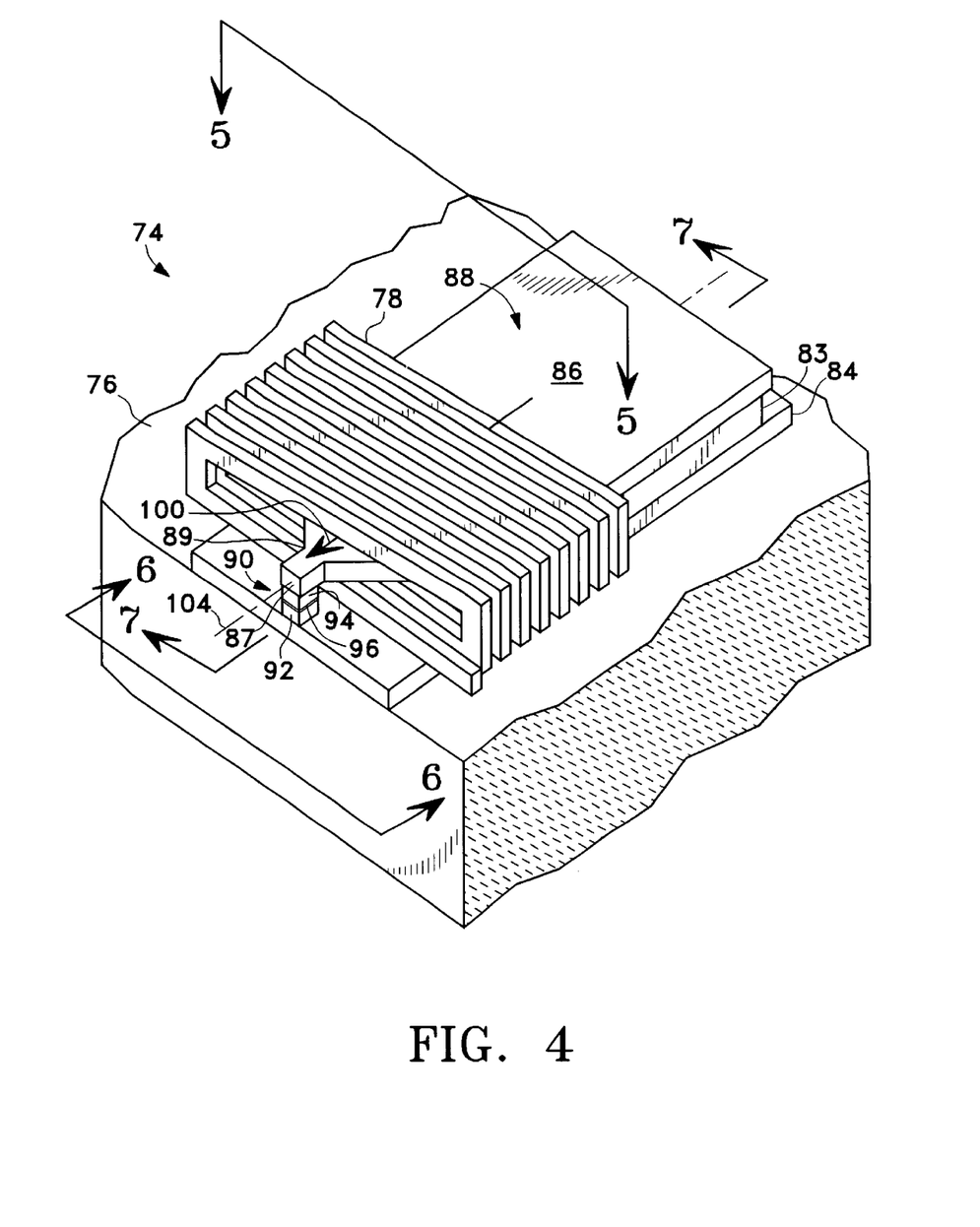
FIG. 4 is a perspective view of an embodiment of the magnetic head of the invention.

As illustrated in FIG. 4, the second yoke layer 86 has a "nose" section 87 that is formed between the air bearing surface of the magnetic head and the rectangular second yoke layer. The length of the nose section 87 from the air bearing surface to its inflection point is greater than the throat height which is defined as the length of the pole tips 92 and 94. The inflection point is that point at which the second yoke layer diverges from the nose section 87. The nose section 87 is disposed above the pole tip layer 94. The length of the nose section 87 is measured from the air bearing surface, which is defined by the ends of the pole tips 92, 94 and the transducing gap 96 therebetween, to the inflection point 89 where the nose section meets the diverging portion of the second yoke layer 86. A distinct advantage of having a longer nose section is that the gap field is effectively reduced, thereby significantly improving high density data recording.

During data writing, current passing through the coil 78 induces magnetic flux in the yoke layers 84 and 86. The induced magnetic flux passes through the closed magnetic path 100, reaching the gap layer 96 and magnetizes the recording medium 72 (FIG. 5).

During data reading, magnetic flux emanating from the recording medium 72 (FIG. 5) is intercepted by the insulating gap 96. The intercepted magnetic flux flows along the continuous magnetic path 100 defined by the two yoke layers 84 and 86 and induces electrical current in the inductive coil 78. The induced current in the coil corresponds to the data content stored on the recording medium 72.

The coil 78 is dielectrically insulated from the first and second yoke layers 84 and 86 through intervening dielectric layers 98 (FIG. 7). An insulating overcoat layer 102 deposited on the second yoke layer 86 physically protects the magnetic head 74. In this embodiment, the material selected for the dielectric and insulating layers 98 and 102 is alumina ($Al_2O_3$). Alternatively, other insulating materials such as silicon dioxide ($SiO_2$), silicon nitride ($Si_3N_4$), aluminum nitride ($AlN_4$) or diamond-like-carbon (DLC) can also be used. The material for the first and second yoke layers 84 and 86, and the first and second pole tip layers 92 and 94, is preferably made of a material having a high magnetic moment. Exemplary materials are cobalt zirconium tantalum alloy (CoZrTa), cobalt zirconium niobium alloy (CoZrNb), iron nickel alloy (NiFe), and iron tantalum niobium alloy (FeTaNb). The choice of high magnetic moment material for the layers 84, 86, 92 and 94 is to prevent premature magnetic saturation of the magnetic head 74 during data writing. Writing on media with high coercivity necessitates the use of higher writing current. However, higher writing current generates higher magnetic flux which in turn can drive the yoke layers 84 and 86 and the pole tip layers 92 and 94 into a deeper state of magnetization. At still higher driving current through the coil 78, a point may be reached in which the yoke layers 84 and 86 and the tip layers 92 and 94 can no longer be responsive to the corresponding increase in driving flux. The layers are then said to be in magnetic saturation. Premature magnetic saturation in these layers would render the head 74 incapable of accepting high writing current necessary to write media with high coercivity. Using high magnetic moment material for the layers 84, 86, 92 and 94 prevents these layers from running into premature saturation when the head 74 is operating at a high current mode.

It should be noted that the second yoke layer 86 of the invention has a substantially level cross-sectional profile as can be shown in FIGS. 4–7. Making the second yoke layer 86 topographically flat provides various advantages.

To begin with, the problem of step coverage commonly encountered in thin film product processing is less of a concern. In microelectronic thin film product fabrication, the overlying layers are very often more difficult to be deposited than the underlying layers and thus less reliable. The reason is that the overlying layers normally encounter more topological unevenness during deposition, and thus are confronted with more step coverage problems than the underlying layers. Providing a flat second yoke layer 86 in accordance with this invention is especially advantageous in the formation of a merged head where the read transducer is formed over the flat second yoke layer 86.

It is a feature of this invention that the flat second yoke layer 86 reduces the length and curvature of the magnetic path 100. The consequential benefit of a short and more direct magnetic path 100 is multi-fold. First, the reluctance R of the magnetic path 100 is reduced. The reluctance R is defined by the following mathematical formula:

$$R = \frac{E}{\phi} \quad (1)$$

where E is the electromotive force driving the coil 78, measured in A-turns; and p is the magnetic flux induced in the magnetic path 100 in Webers. The definition of the reluctance R is somewhat analogous to that of the resistance in Ohm's law and is determined by the following algebraic equation:

$$R = v\frac{l}{A} \quad (2)$$

where l is the length of the magnetic path 100 in $\mu$; A is the cross-sectional area of the path 100 in $\mu^2$; and v is the reluctancy of the material which defines the magnetic path 100. Here, the flat second yoke layer 86 virtually has no profile curvature. Thus, the magnetic path 100 can be implemented with a short path length l, which in turn lowers the overall reluctance R of the magnetic path 100. Second, the flat second yoke layer 86 and the shortened path length l impose less mutual inductance upon the coil 78. The coil 78 operates with less inductance and is a more agile coil. Furthermore, the second yoke layer 87 with its flat topology is less prone to trigger magnetic domain instability in the layer 86, and consequently allows the head 74 to operate with less susceptibility to Barkhausen noise. Also, the shorter path length l can be driven by the coil 78 with less number of turns, which in turn reduces the overall resistance of the current path through the coil 78. Lower resistance of the current path through the coil 78 cuts down Johnson noise of the head 74 and thus improves the signal-to-noise ratio.

The inventive arrangement of encompassing the flat second yoke layer 86 with the toroidal coil 78 is especially advantageous for high data rate transfer applications. By virtue of coinciding the coil axis 104 with the second yoke layer 86, induced magnetic flux need not traverse through a long, inductive magnetic path. Instead, the generated flux is efficiently delivered to the pole tip layers 92 and 94 for use during data writing. Likewise, during data reading, the same advantages are available. The combined effect is that the head 74 can be fabricated with a less number of coil turns and yet with no compromise in performance.

It also needs to be pointed out that magnetic heads are now fabricated on microscopically confined areas with limited heat dissipation capacity. In most prior heads, in order to effectively drive the yoke layers with high reluctance and inductance on the one hand, and to ease the heat dissipation problem by avoiding injecting excessive current into the coil on the other hand, the number of windings of the coils are accordingly increased by stacking the coil windings to more than one level. However, an increase in coil winding levels requires additional profile curvature for the yoke layers harnessing the coils, resulting in a further increase in both the self inductance of the coils and the mutual inductance of the yoke layers. Balancing the need for performance and and the need for reliability, a compromise point needs to be struck. Accordingly, most prior art heads are not optimally designed. The aforementioned problems are less of a concern in the magnetic heads disclosed herein, because the inventive heads need no excessive coil windings.

Figure 8:
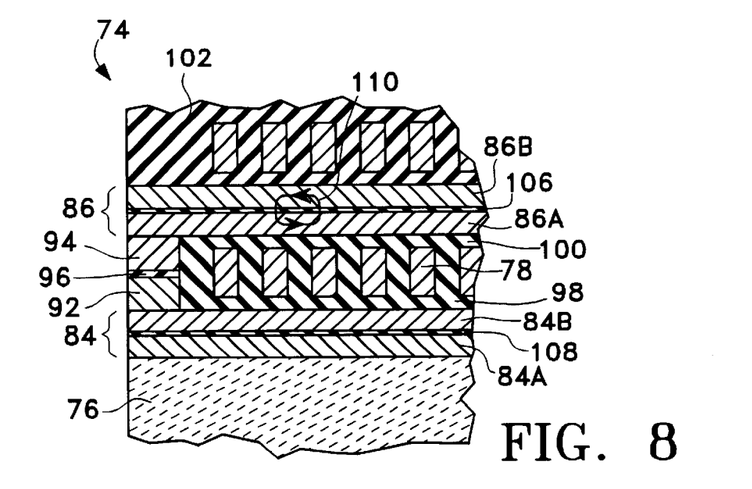
FIG. 8 is a cross-sectional side view of a variation of the magnetic head shown in FIGS. 4–7 implemented with laminated yoke layers.

FIG. 8 shows a variation of the magnetic head 74 implemented with laminated first and second yoke layers 84 and 86. Each yoke layer 84 or 86 is laminated by means of an insulating layer. For example, in the first yoke layer 84, an insulating layer 108 is sandwiched between two sublayers 84A and 84B. Likewise, in the second yoke layer 86, another insulating layer 106 is interposed between two sublayers 86A and 86B. Laminating the yoke layers 84 and 86 prevents the formation of eddy current during high frequency operations. An exemplary eddy current path is shown as path 110 in FIG. 8. Eddy current can flow along the path 110 if the insulating layer 106 is absent. Eddy current arises mainly in response to oppose any magnetic flux changes in accordance with Lenz's law. Formation of eddy current is undesirable because it deleteriously affects the intercepted flux during data reading and the driving flux during data writing, and thereafter converts and dissipates the flux as wasteful heat. The eddy current effect, especially occurring in high frequency applications, can be prevented by laminating the yoke layers 84 and 86 as shown in FIG. 8.

Figure 9:
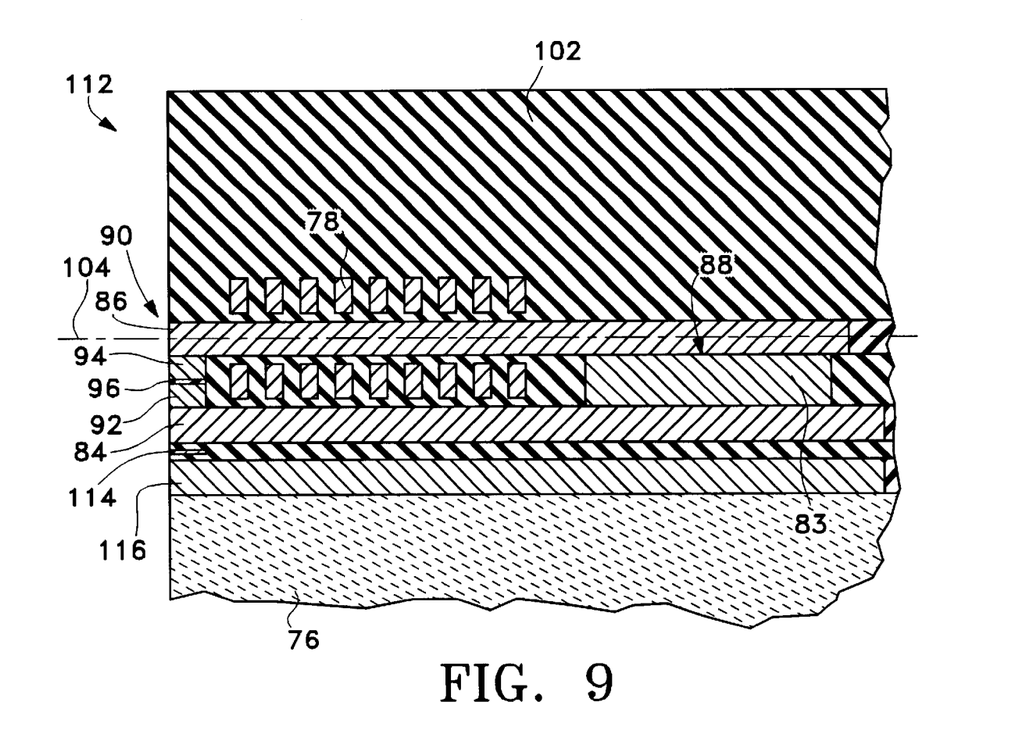
FIG. 9 is a cross-sectional side view of a second embodiment of the invention, fabricated as a merged head with the read transducer disposed below the write transducer.

FIG. 9 illustrates a second embodiment of the invention, wherein a magnetic head 112 includes a read transducer 114, which is a magnetoresistive transducer that can be an anisotropic magnetoresistive (AMR) transducer, a giant magnetoresistive (GMR) transducer, or a spin valve sensor. The magnetoresistive transducer 114 is sandwiched between and dielectrically separated from a pair of magnetic shields 116 and 84. In this embodiment, the layer 84 performs the dual function acting as a first yoke layer for the coil 78 and as a shield layer for the read transducer 114.

Figure 10:
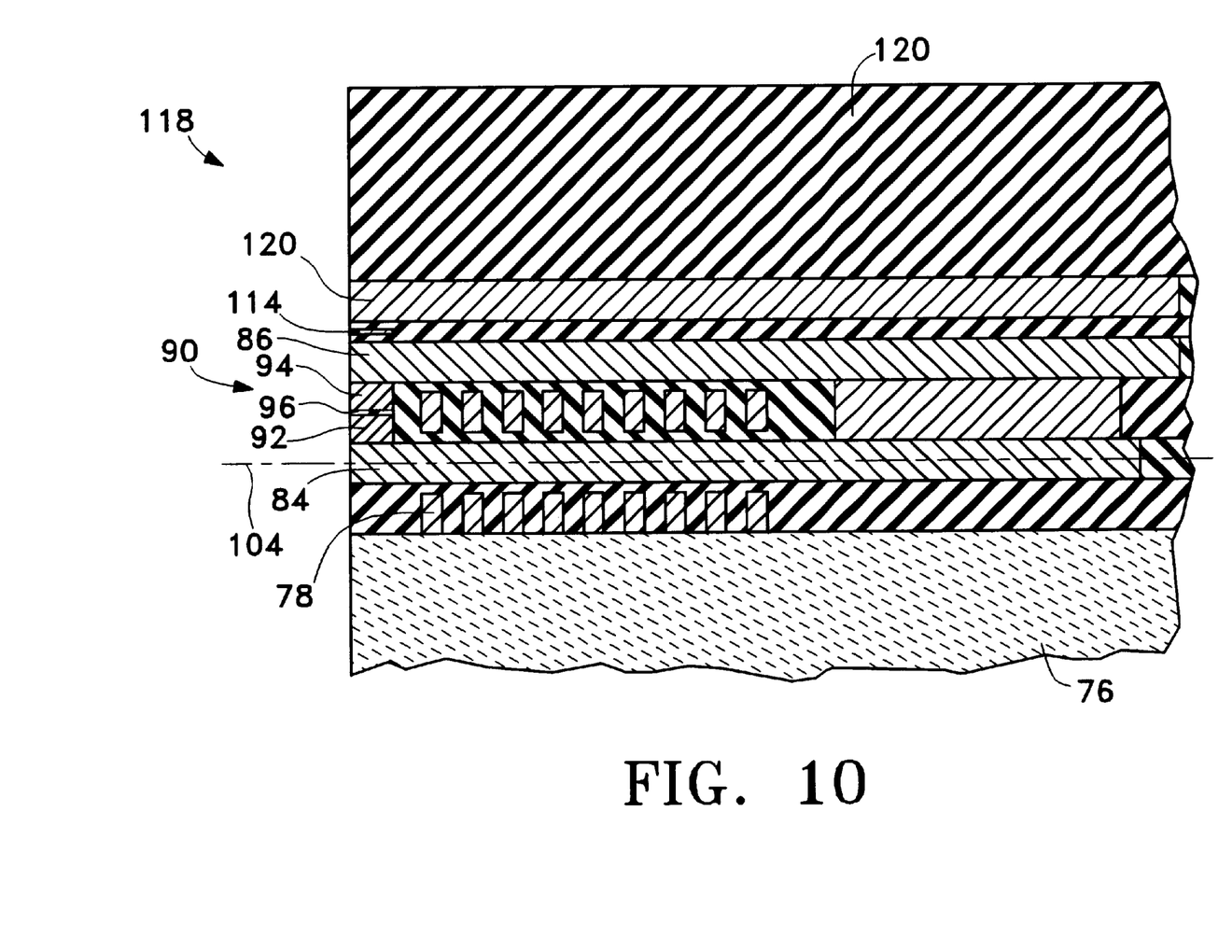
FIG. 10 is a cross-sectional side view of a third embodiment of the invention, fabricated as a merged head with the read transducer disposed above the write transducer.

FIG. 10 shows a third embodiment of a magnetic head 118, made in accordance with the invention. In this embodiment, the read transducer 114 is disposed above the write transducer and the substrate 76. Again, the read transducer 114 can be an anisotropic magnetoresistive (AMR) transducer, a giant magnetoresistive (GMR) transducer, or a spin valve sensor. As with the second embodiment, the magnetoresistive transducer 114 is sandwiched between and dielectrically separated from a pair of magnetic shields 86 and 120. In this embodiment, the layer 86 performs the dual role as a second yoke layer for the coil 78 and as a shield layer for the read transducer 114. Conventionally, the read transducer 114 is fabricated prior to the write transducer. The rationale behind this arrangement is that the formation of the magnetoresistive transducer involves laying a number of delicate and ultra-thin layers which need level supporting layers. Depositing the delicate layers associated with the read transducer close to the substrate poses less of a step coverage problem. However, the disadvantage with this approach is that forming the inductive head including the coil with the associated layers subsequently involves several high heat annealing cycles, which may be detrimental to the already built read transducer with the delicate layers. The magnetic head 118 of the third embodiment eases this problem because the flat topographical feature of the second yoke layer 86 substantially alleviates the problem of step coverage.

Other variations are possible within the scope of the invention. Materials used for the magnetic heads of the invention need not be restricted to those described. For example, in addition to the insulating materials recited, hard-baked photoresist can be used as a substitute.

What is claimed is:

1. A magnetic head comprising:
    a substrate having a major surface and an air bearing surface disposed perpendicular to said major surface;
    first and second yoke layers formed parallel to each other and of high magnetic moment material disposed over said major surface of said substrate;
    first and second pole tip layers with aligned sidewalls, said pole tip layers being planar with said yoke layers respectively and having lengths extending from said first and second yoke layers respectively to said air bearing surface;
    a toroidal coil assembly encompassing only one of said yoke layers, wherein said toroidal coil includes a plurality of coil windings defining a coil axis which is coincident with said encompassed yoke layer;
    wherein each of said yoke layers is characterized by a completely flat geometry with a level cross-sectional profile;
    wherein the cross-sectional area of the first yoke layer is greater than that of said second yoke layer;
    including a read transducer formed with the magnetic head;
    wherein said second yoke layer is formed with a nose section having a length extending from one end from said air bearing surface to an inflection point located at a second end of said nose section at which said second yoke layer diverges and the nose length of the nose section is greater than the length of said pole tip layers; and
    wherein said magnetic head has a low inductance enabling processing of high frequency data signals with high data areal density.

2. The magnetic head as set forth in claim 1 wherein said read transducer is a giant magnetoresistive transducer.

3. The magnetic head as set forth in claim 1 wherein said read transducer is an anisotropic magnetoresistive transducer.

4. The magnetic head as set forth in claim 1 wherein said toroidal coil encompasses said second yoke layer.

5. The magnetic head as set forth in claim 1 wherein said read transducer is a spin tunneling sensor.

6. The magnetic head as set forth in claim 1 wherein said yoke layers are formed of a material selected from a group consisting of cobalt zirconium tantalum alloy (CoZrTa), cobalt zirconium niobium alloy (CoZrNb), iron nickel alloy (FeNi) and iron tantalum niobium alloy (FeTaNb).

7. The magnetic head as set forth in claim 1 wherein each of said yoke layers is laminated with insulating material.

8. A magnetic head as in claim 1, wherein said first yoke layer is completely rectangular.

9. A magnetic head as in claim 1, including a first magnetic shield disposed over said substrate, wherein said read transducer is located between said first magnetic shield and said first yoke layer which serves as a shield layer for said read transducer.

10. A magnetic head as in claim 1, wherein said read transducer is located above said second yoke layer which serves as a shield layer for said read transducer.

* * * * *